United States Patent [19]
Bridges et al.

[11] Patent Number: 5,515,522
[45] Date of Patent: May 7, 1996

[54] COHERENCE INDEX GENERATION FOR USE BY AN INPUT/OUTPUT ADAPTER LOCATED OUTSIDE OF THE PROCESSOR TO DETECT WHETHER THE UPDATED VERSION OF DATA RESIDES WITHIN THE CACHE

[75] Inventors: K. Monroe Bridges, Fremont; William R. Bryg, Saratoga; Stephen G. Burger, Santa Clara; James M. Hull, Cupertino, all of Calif.; Michael L. Ziegler, Whitinsville, Mass.

[73] Assignee: Hewlett-Packard Company, Palo Alto, Calif.

[21] Appl. No.: 201,433

[22] Filed: Feb. 24, 1994

[51] Int. Cl.⁶ .................................................. G06F 12/00
[52] U.S. Cl. ........................ 395/468; 395/445; 395/403; 395/800; 364/964.2; 364/964.34; 364/243.41; 364/246.3; 364/246.5; 364/DIG. 1
[58] Field of Search .................................. 395/425, 375, 395/200, 400, 468, 800, 445, 403; 364/DIG. 1, DIG. 2

[56] References Cited

U.S. PATENT DOCUMENTS

| | | | |
|---|---|---|---|
| 4,680,700 | 7/1987 | Hester et al. | 395/400 |
| 4,797,817 | 1/1989 | Nguyen et al. | 395/400 |
| 4,885,680 | 12/1989 | Anthony et al. | 395/425 |
| 5,025,365 | 6/1991 | Mathur et al. | 395/600 |
| 5,029,070 | 7/1991 | McCarthy et al. | 395/425 |
| 5,155,843 | 10/1992 | Stamm et al. | 395/575 |
| 5,197,133 | 3/1993 | Shen et al. | 395/375 |
| 5,404,467 | 4/1995 | Saba et al. | 395/375 |
| 5,438,670 | 8/1995 | Baror et al. | 395/483 |

FOREIGN PATENT DOCUMENTS

| | | | |
|---|---|---|---|
| 0212129 | 6/1986 | European Pat. Off. | G06F 12/10 |
| 0140522 | 8/1995 | European Pat. Off. | G06F 12/10 |

OTHER PUBLICATIONS

David A. Patterson, John L. Hennessey, *Computer Architecture A Quantitative Approach*, Morgan Kauffman Publishers, Inc., San Mateo, California, 1990, pp. 466–474.

Series 10000 Technical Reference Library vol. 6–Core System Buses and Controllers, Order No. 011725–A00, Apollo Computer, Inc. Chelmsford, MA, 2-1 through 2-16, 3-22 through 3-28.

Todd A. Dutton, "The Design of the DEC 3000 Model 500 AXP Workstation," Feb. 22, 1993, Proceedings of the Spring Computer Society International Conference (COMPCON), San Francisco, Feb. 22–26, 1993, of Electrical and Electronics Engineers, pp. 450–452.

*Primary Examiner*—Meng-Ai An

[57] ABSTRACT

A computing system includes a memory bus, a main memory, an I/O adapter and a processor. The main memory, the I/O adapter and the processor are connected to the bus. The I/O adapter includes a translation map. The translation map maps I/O page numbers to memory address page numbers. The translation map includes coherence indices. The processor includes a cache and an instruction execution means. The instruction execution means generates coherence indices to be stored in the translation map. The instruction execution means performs in hardware a hash operation to generate the coherence indices.

21 Claims, 6 Drawing Sheets

COHERENCE INDEX GENERATION FOR USE BY AN INPUT/OUTPUT ADAPTER LOCATED OUTSIDE OF THE PROCESSOR TO DETECT WHETHER THE UPDATED VERSION OF DATA RESIDES WITHIN THE CACHE

BACKGROUND

The present invention concerns generation of a coherence index for use by an input/output adapter.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor.

In addition to using a cache memory to retrieve data from main memory, the CPU may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory. A data block which is overwritten or copied out of cache memory when new data is placed in the cache memory is called a victim block or a victim line.

When an I/O adapter accesses the main memory in a system where one or more processors utilizes a cache, it is necessary to take steps to insure the integrity of data accessed in memory. For example, when the I/O adapter accesses (writes or reads) data from memory, it is important to determine whether an updated version of the data resides in the cache of a processor on the system. If an updated version of the data exists, something must be done to insure that the I/O adapter accesses the updated version of the data. An operation that assures that the updated version of the data is utilized in a memory references is referred to herein as a coherence operation.

There are many factors which need to be taken into account to assure that a coherence operation is successful. For example, in many systems, data stored in a cache is generally accessed using an index derived from a virtual address. Further, a hashing algorithm is often used to distribute data within the cache. Accesses from the system memory, however, are performed using a real address.

Various schemes have been suggested to insure coherence of data accessed by an I/O adapter from the system memory. For example, one solution is for software to explicitly flush the cache for each processor on the system whenever data is accessed from the main memory. Flushing the cache will assure that any updated version of the data will be returned to the main memory before the data is accessed by the I/O adapter. However, this scheme can significantly increase the overhead of a memory access by the I/O adapter.

In another scheme, each system processor includes a "BLT" table which translates real addresses to virtual addresses. When the I/O adapter accesses the system memory, each system processor translates the real address to a virtual address and accesses its cache to determine whether the accessed data is in the cache. If so, the accessed data is flushed to memory before the I/O adapter completes the access. Alternately, the I/O adapter can access the data directly from the cache.

In another scheme, when the I/O adapter accesses memory, the I/O adapter forwards to each processor a coherence index. The coherence index is used by each processor to access the cache associated with the processor to determine whether the accessed data is in the cache. If so, the accessed data is flushed to memory before the I/O adapter completes the access. Alternately, the I/O adapter can access the data directly from the cache.

Coherence indices for memory accesses can be stored in a translation table within the I/O adapter. A processor which initiates an I/O access can place the appropriate indices within the translation table within the I/O adapter. In a computing system in which a processor cache is accessed using a portion of the virtual address, placing the appropriate indices within the translation table within the I/O adapter can be a matter of extracting the cache index from a virtual address and performing a data transfer of the index to the translation table within the I/O adapter. However, in a computing system in which a cache index is derived by hashing the virtual address, obtaining a coherence index may require several additional operations to perform the hashing operation. This can significantly increase the overhead of a memory access by the I/O adapter.

SUMMARY OF THE INVENTION

In accordance with the preferred embodiment of the present invention, a computing system includes an interconnect means, a main memory, an input/output (I/O) adapter and a processor. In the preferred embodiment the interconnect means is a bus. Alternately, the interconnect means may be a ring network, crossbar switches or any memory interconnect that uses coherent I/O.

The main memory, the I/O adapter and the processor are connected to the bus. The I/O adapter includes a translation map. The translation map maps I/O page numbers to memory address page numbers. The translation map includes coherence indices. The processor includes a cache and an instruction execution means. The instruction execution means generates coherence indices to be stored in the translation map. The instruction execution means performs in hardware a hash operation to generate the coherence indices.

In the preferred embodiment of the present invention, the instruction execution means executes a load coherence index instruction. The load coherence index instruction includes as parameters a base register, an index register, a space register select and a target register. The instruction execution, in response to the load coherence index instruction and the accompanying parameters, generates a virtual address. The instruction execution then performs a hash operation on a subset of bits from the virtual address to generate a coherence index.

In the preferred embodiment, the virtual address is formed using a space identification from information stored in the base register and the space register select. The formation of the virtual address also utilizes an offset from information stored in the base register and information stored in the index register. The virtual address is the concatenation of the space identification and the offset.

In the preferred embodiment, the base register is a first general register which currently stores a base value. The index register is a second general register which currently stores an index value. The target register is a third general register which will receive the coherence index.

Once generated, the coherence index is stored in the translation map within the I/O adapter. When performing a data transfer, the I/O adapter forwards an appropriate coherence index to the processor. When the processor receives the coherence index from the I/O adapter, the processor uses the coherence index to access data within the cache.

The preferred embodiment of the present invention allows the generation of a coherence index for a translation table within an input/output (I/O) adapter with a minimum of overhead. Implementation of the present invention requires minimum modification to existing hardware when the hardware used to generate cache indices is also utilized to generate the coherence index in response to the load coherence index instruction.

DESCRIPTION OF THE PREFERRED EMBODIMENT

Figure 1:
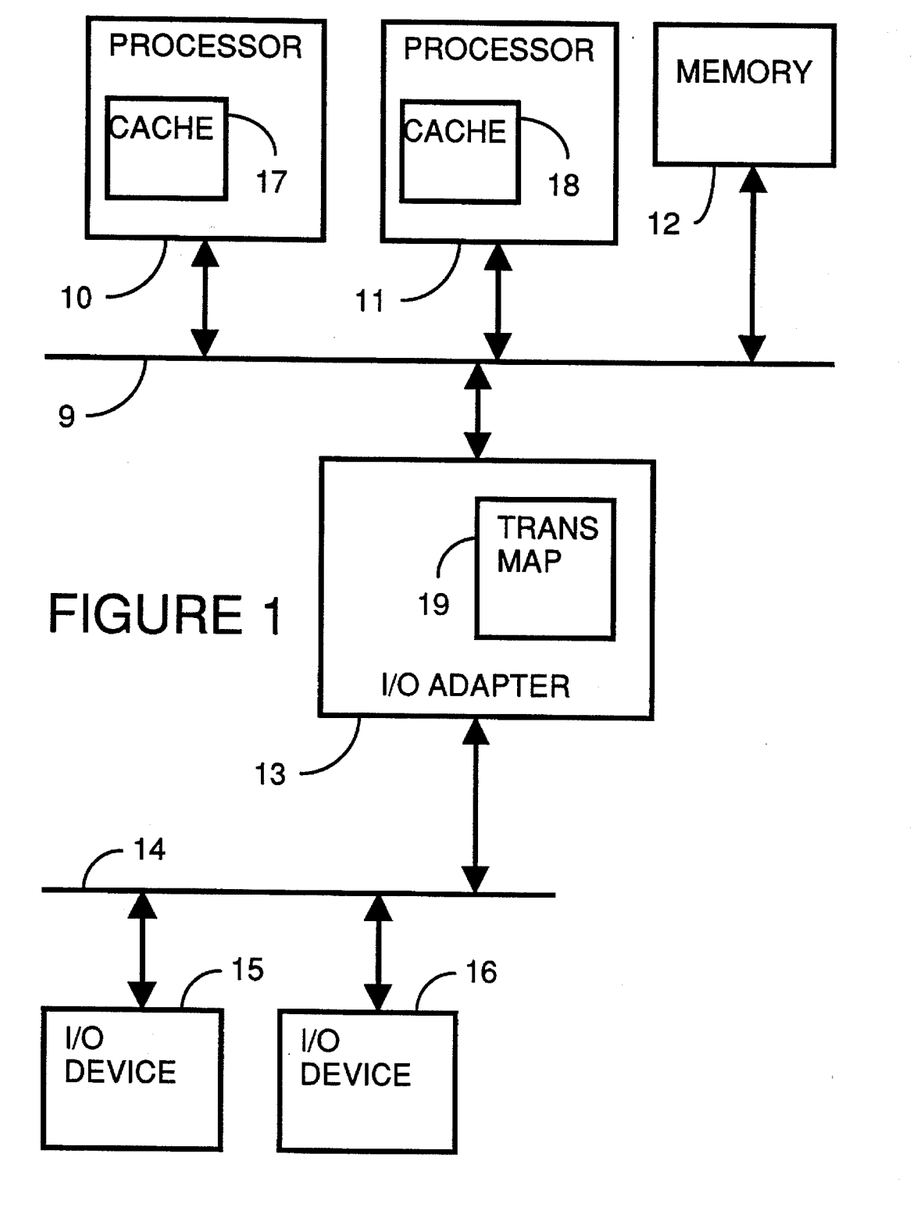
FIG. 1 shows simplified block diagram of a computer system with an input/output (I/O) adapter in accordance with a preferred embodiment of the present invention.

FIG. 1 shows a simplified block diagram of a computer system. A processor 10, a processor 11 and a memory 12 are shown connected to a memory bus 9. Processor 10 utilizes a data cache 17. Processor 11 utilizes a data cache 18. Also connected to memory bus 9 is an input/output (I/O) adapter 13. I/O adapter 13 is connected to an I/O bus 14. Also connected to I/O bus 14 are an I/O device 15 and an I/O device 16. A translation map 19 is used to convert addresses used for I/O bus 14 to addresses used by memory 12.

Figure 2:
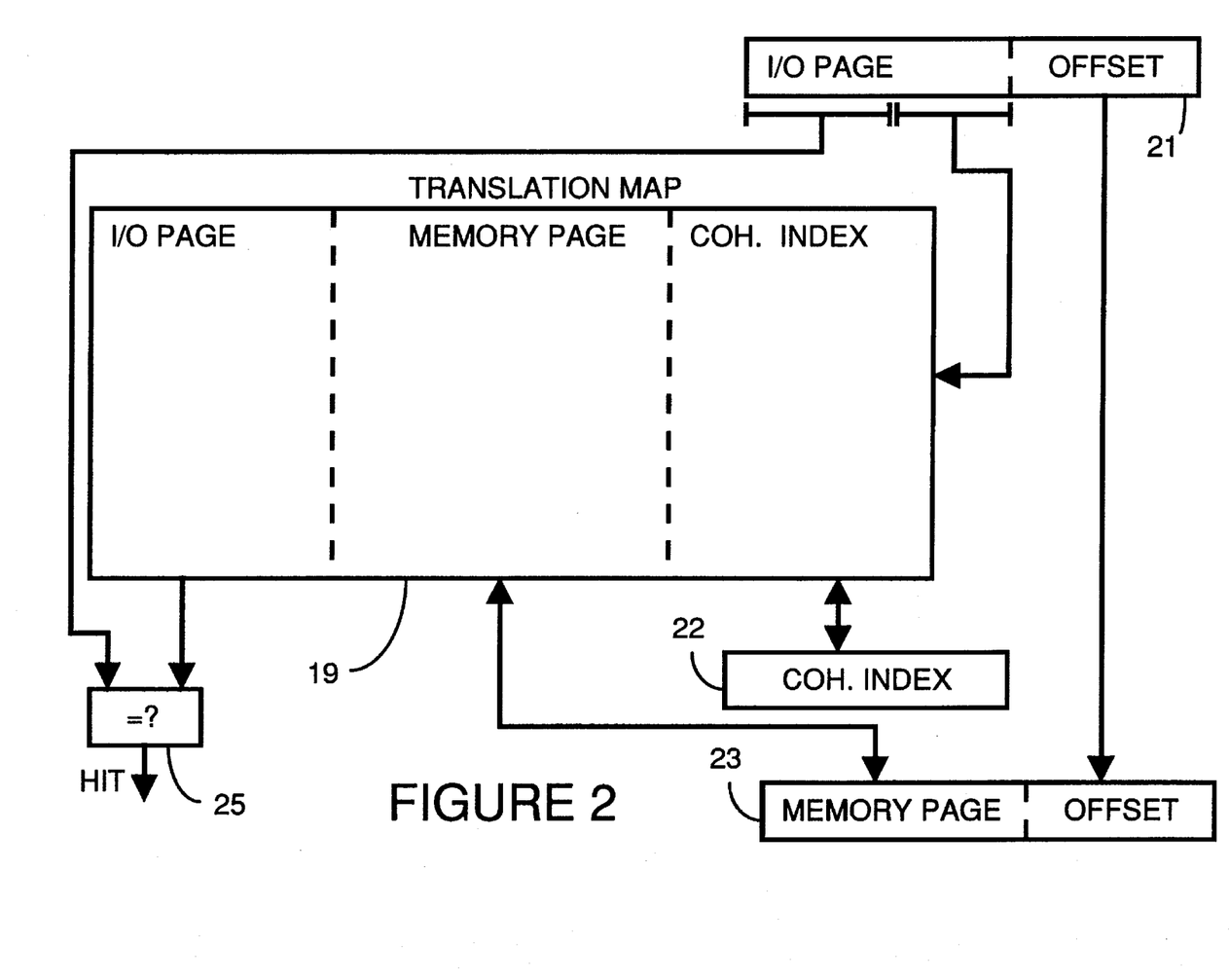
FIG. 2 shows an implementation of a translation map within the I/O adapter shown FIG. 1, in accordance with a preferred embodiment of the present invention.

FIG. 2 shows implementation of translation map 19 in accordance with the preferred embodiment of the present invention. Translation map 19 is used to translate an I/O bus address 21 to a memory address 23. Translation map 19 is implemented as a direct mapped cache of I/O translations. Alternately, translation map 19 could be implemented as a fully associative cache, a set associative cache or a fully populated table of I/O page translations. Any of the implementations would be clearly understood by persons of ordinary skill in the art.

In the preferred embodiment, during a translation, an I/O page is used to access a corresponding memory page within translation map 19. In the embodiment shown in FIG. 2, a first portion of I/O page bits is used as an index into translation map 19 and a second portion of the I/O page bits is used by a comparator 25 to determine whether the currently sought translation is within translation map 19. The I/O address offset is the same as the memory address offset. For example, in the preferred embodiment, I/O bus 14 utilizes thirty-two bit addresses, each address having a twenty bit I/O page number and a twelve bit offset. Memory bus 14 utilizes forty bit addresses, each address having a twenty-eight bit memory page number and a twelve bit offset.

In the preferred embodiment, for each memory page, translation map 19 also includes a coherence index. The coherence index is a portion derived from a virtual address and used to index cache 17 within processor 10 and cache 18 within processor 11. When the coherence index is passed as part of a memory access transaction, it allows processors 10 and 11 to easily look up information in cache 17 and 18, respectively, for potential coherency conflicts.

Figure 3:
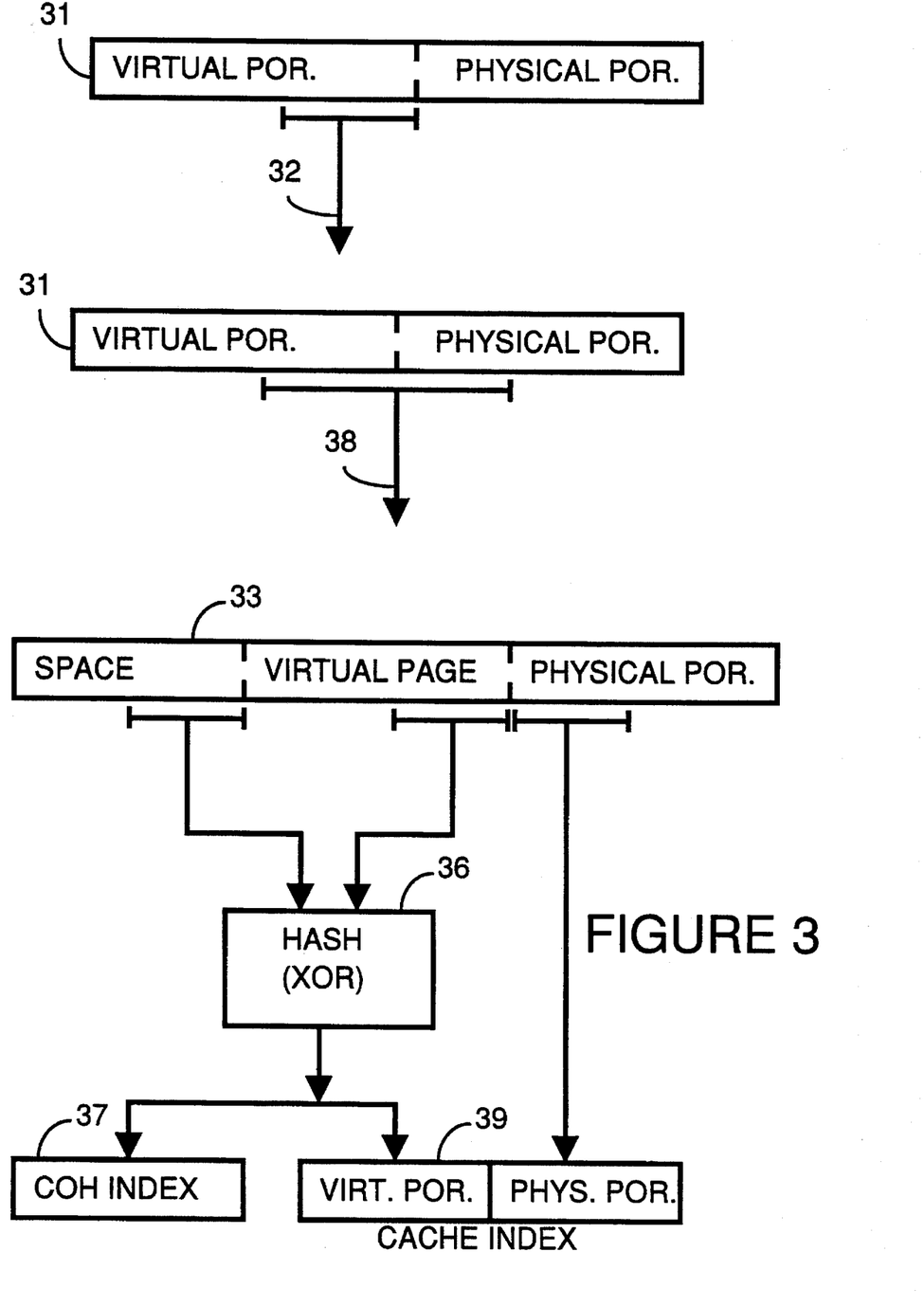
FIG. 3 illustrates generation of a cache/coherence index for the computer system shown in FIG. 1 in accordance with the preferred embodiment of the present invention.

Operating system software running on processor 10 or processor 11, loads address translation information into translation map 19 within I/O adapter 13. This information includes the coherence index. For example, FIG. 3 shows a virtual address 31. Virtual address 31 includes a virtual portion and a physical portion. In a system which utilizes unhashed virtual cache indices, a coherence index 38 is generated using a subset of the bits which form the virtual portion of virtual address 31. A cache index 38 is generated using a subset of the bits which form the virtual portion of virtual address 31 in addition to a subset of the bits of the physical portion. In such a system, the virtual portion of the cache index is the coherence index, which the operating system may directly extract from the virtual address and store it in translation map 19 within I/O adapter 13.

FIG. 3 also shows a virtual address 33. Virtual address 33 includes a space identification, virtual page and a physical portion. In this system, a cache index 39 is generated by hashing a subset of the bits which form the space identification of virtual address 33 with a subset of the bits which form the virtual portion of virtual address 33 using hashing hardware 36, concatenated with a subset of the physical portion of the virtual address. A coherence index 37 is generated the same way as the virtual portion of cache index 39, as shown in FIG. 3.

In the following description, bits are numbered in a "big-endian" format, with bit 0 at the left or most-significant end, and the high numbered bit at the right or least-significant end.

For example, in the preferred embodiment virtual address 33 is a forty-eight bit address. Bits 0 through 15 (spac [16,17, . . . ,31]) specify the space identification. Bits 16 through 35 (virt [0,1, . . . ,19]) specify the virtual page number. Bits 36 through 47 (virt [20,21, . . . ,31]) specify the physical portion of the address. The cache address bits (cach [12,13 . . . ,26]) are used to access cache 17 are derived as set out in Table 1 below:

TABLE 1

| Cache bit | | Virtual page/phys bit | Function | Space id. bit |
|---|---|---|---|---|
| cach [26] | = | virt [26] | (none) | |
| cach [25] | = | virt [25] | (none) | |
| cach [24] | = | virt [24] | (none) | |
| cach [23] | = | virt [23] | (none) | |
| cach [22] | = | virt [22] | (none) | |
| cach [21] | = | virt [21] | (none) | |
| cach [20] | = | virt [20] | (none) | |
| cach [19] | = | virt [19] | XOR | spac [28] |
| cach [18] | = | virt [18] | XOR | spac [29] |
| cach [17] | = | virt [17] | XOR | spac [30] |
| cach [16] | = | virt [16] | XOR | spac [31] |
| cach [15] | = | virt [15] | XOR | spac [27] |
| cach [14] | = | virt [14] | XOR | spac [26] |
| cach [13] | = | virt [13] | XOR | spac [25] |
| cach [12] | = | virt [12] | XOR | spac [24] |

As may be seen from Table 1 above, the hashing used in the preferred embodiment of the present invention requires a logic "exclusive-or" (XOR) function to be performed to generate eight of the cache bits (cach [12 . . . ,19]). Performance of the hashing in software requires several software instructions to generate the cache index. Further, different generations of processors may use different hashes to access their cache. Thus it would be necessary for software to perform a different calculation dependent on the processor type or revision.

Figure 4:
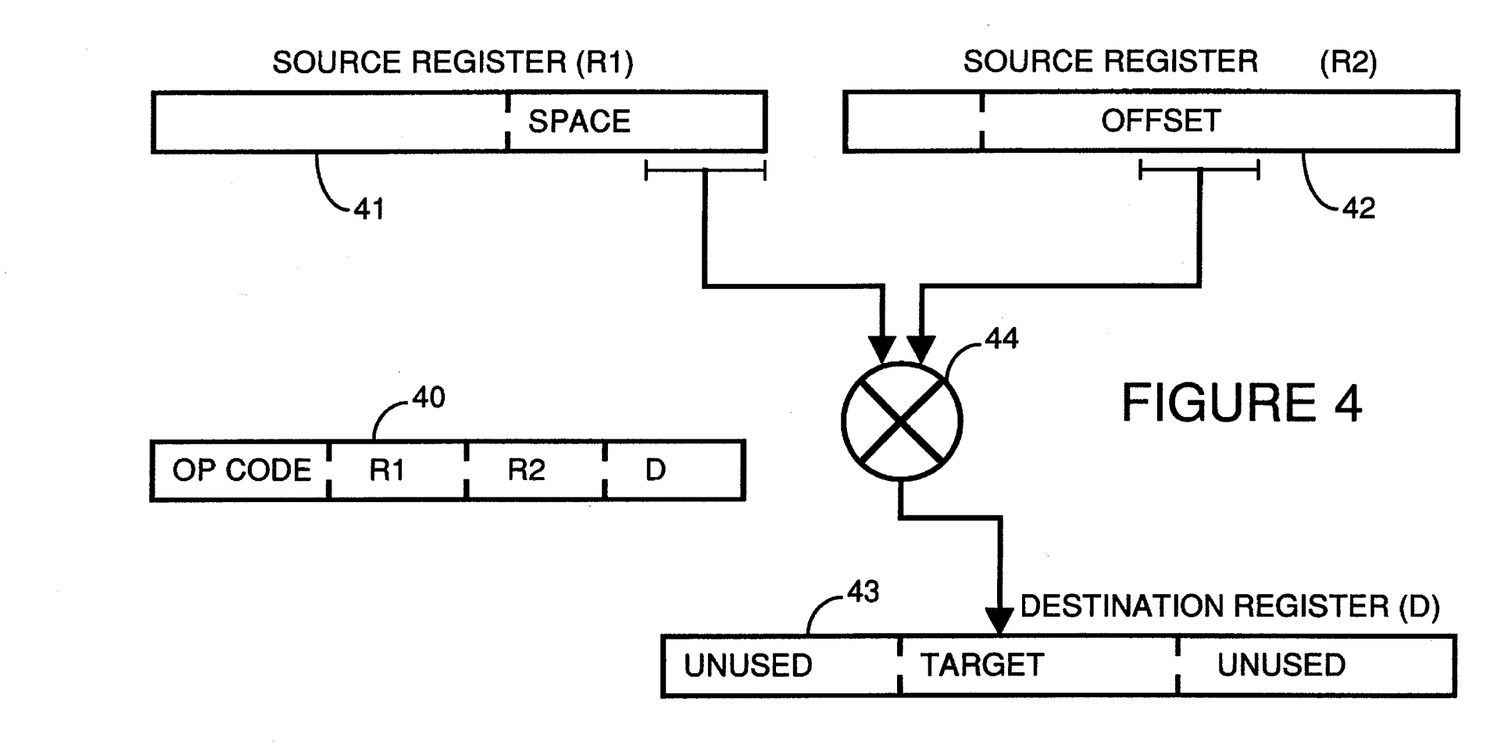
FIG. 4 shows the format for a simplified instruction to generate a coherence index and hardware implementation of the operation set out by the instruction in accordance with a preferred embodiment of the present invention.

In the preferred embodiment of the present invention, however, processor 10 and processor 11 each includes within its instruction set a processor instruction to support virtual coherent I/O. FIG. 4 shows a simplified layout 40 for such a processor instruction. The instruction includes an operation code, a reference to a first source register (R1) 41 which includes a space identification, a reference to a second source register (R2) 42 which includes a virtual offset (virtual page plus physical portion) and a destination register (D) 43 into which the target value (coherence index) is placed. As will be clear to persons of ordinary skill in the art, in certain processor architectures the virtual address can be specified using a single register. Once generated the coherence index may be stored within translation map 19 within I/O adapter 13. In the preferred embodiment, when executing the instruction, processor 10 and processor 11 each use hardware to generate the coherence indices. For example, processor 10 uses hardware 49 to generate coherence indices. Hardware 44 is also used by processor 10 to generate cache indices for access into cache 17. The preferred implementation, therefore, of the operation to generate a coherence index uses the function set out in Table 2 below. In the implementation using the function set out in Table 2, the eight bits of defined results matches the calculation used to generate the hashed portion of the cache index.

TABLE 2

| Destination bit | | Offset | Function | Space id. bit |
|---|---|---|---|---|
| Dest [20,21, . . . ,31] | = | Any value | | |
| Dest [19] | = | offset [19] | XOR | spac [28] |
| Dest [18] | = | offset [18] | XOR | spac [29] |
| Dest [17] | = | offset [17] | XOR | spac [30] |
| Dest [16] | = | offset [16] | XOR | spac [31] |
| Dest [15] | = | offset [15] | XOR | spac [27] |
| Dest [14] | = | offset [14] | XOR | spac [26] |
| Dest [13] | = | offset [13] | XOR | spac [25] |
| Dest [12] | = | offset [12] | XOR | spac [24] |
| Dest [0,1, . . . ,11] | = | Any value | | |

Figure 5:
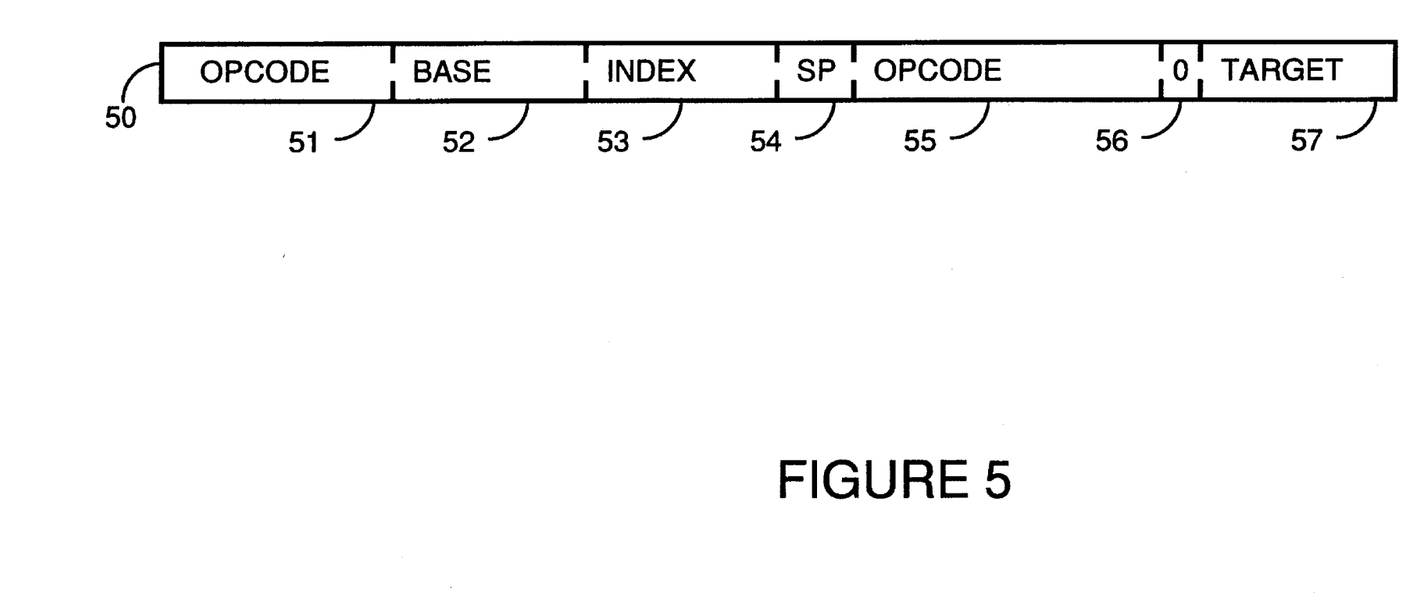
FIG. 5 shows another embodiment of the format for an instruction to generate a coherence index in accordance with the preferred embodiment of the present invention.

FIG. 5 shows another embodiment of the format for an instruction to generate a coherence index in accordance with the preferred embodiment of the present invention. The assembly language call for load coherence index instruction 50 shown in FIG. 5 is LCI x(s,b),t. The instruction reference "LCI" determines the values to be stored in opcode field 51, opcode field 55, opcode field 56. In the preferred embodiment, the hexadecimal value 01 is stored in six bit opcode field 51, the hexadecimal value 4C is stored in eight bit opcode field 55 and the hexadecimal value 0 is stored in one bit opcode field 56. In addition, the general register [x] which stores an index value is specified in a five bit parameter field 53, the general register [b] which stores a base value is specified in a five bit parameter field 52, the general register [t] which receives the target value is specified in a five bit parameter field 57 and a space register select value [s] is specified in a two bit parameter field 54. A space register select field 54 is used in the generation of a forty-eight bit virtual address.

The space identification for the virtual address is generated as a function of the base value stored in general register [b] and the space register select value [s]. The offset is generated as a function of the base value stored in general register [b] and the index value stored in general register [x]. From the space and offset, the coherence index is calculated and placed as the target value in general register [t]. See for example, Table 2, where the target value (Destination bits [0 . . . ,31]) are generated.

Figure 6:
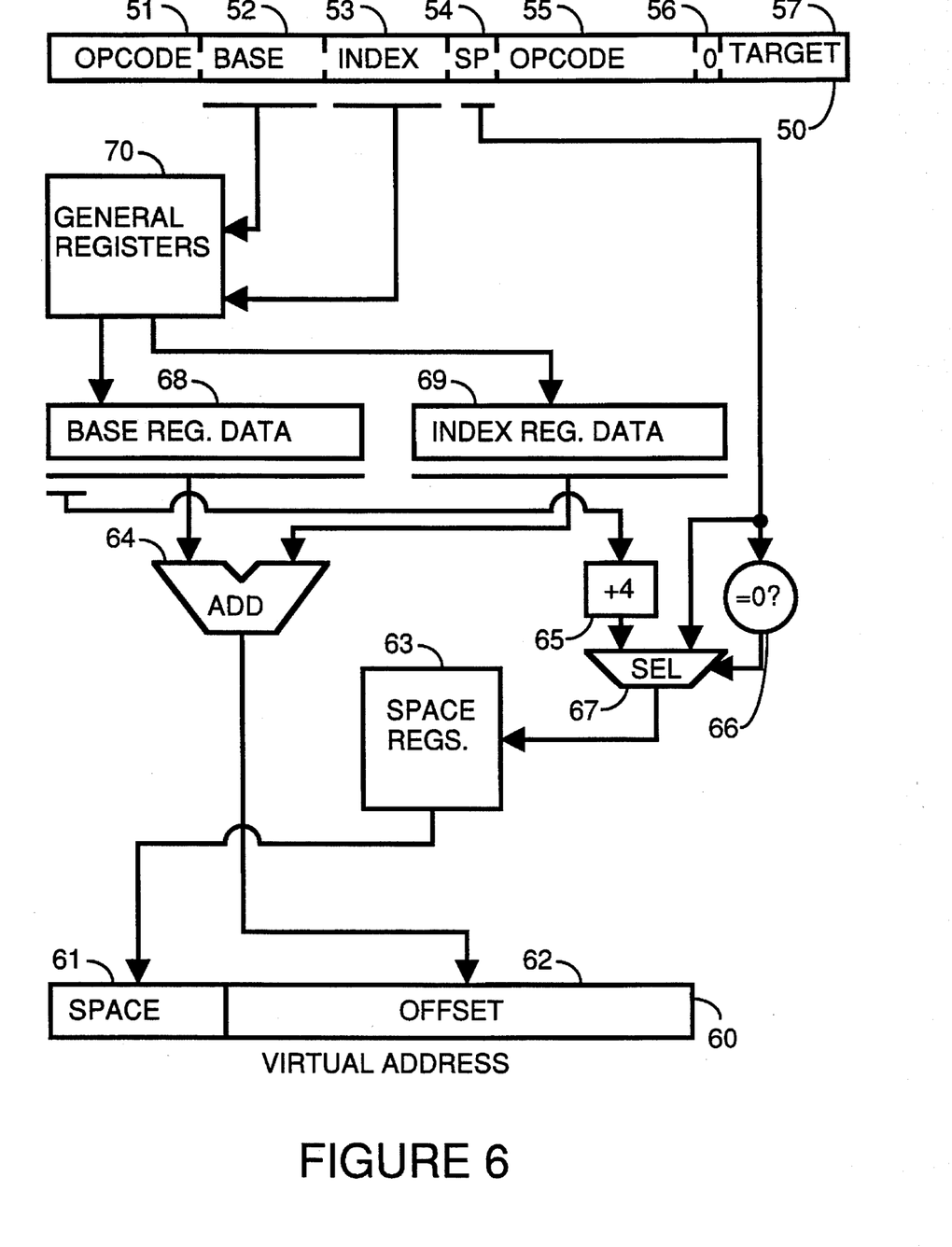
FIG. 6 illustrates generation of a virtual address in accordance with the preferred embodiment of the present invention.

FIG. 6 illustrates how a forty-eight bit virtual address 60 is generated from load coherence index instruction 50 in accordance with the preferred embodiment of the present invention. Forty-eight bit virtual address 60 has a sixteen bit space identifier 61 and a thirty-two bit offset 62. The base value in five bit parameter field 52 is used as an index into general registers 70. General registers 70 has thirty-two registers of thirty-two bits each. The general register selected by the base value in five bit parameter field 52 provides base register data 68. The index value specified in five bit parameter field 53 is also used as an index into general registers 70. The general register selected by the index value specified in five bit parameter field 53 provides index register data 69. An adder 64 adds base register data 68 and index register data 69 to produce offset 62.

The value of space identifier 61 is provided by one of eight space registers 63. Each space register is sixteen bits. For the load coherence index instruction 50 the space register is selected as follows. When the space register select value in two bit parameter field 54 is not equal to zero, as determined by a comparator 66, a selector 67 utilizes the space register select value in two bit parameter field 54 as the index to select the space register from space registers 63 to provide the value of space identifier 61. When the space register select value in two bit parameter field 54 is equal to zero, as determined by comparator 66, selector 67 utilizes the two most significant bits of base register data 68, added to four, as the index to select the space register from space registers 63 to provide the value of space identifier 61.

In the preferred embodiment of the present invention, the use of the coherence index in data transfers alleviates the need for software to flush or purge data from data cache 17 or cache 18 when the data is shared with I/O adapter 13. For I/O output (e.g., transfers from memory 12 to an I/O device through I/O adapter 13), I/O adapter 13 performs coherent read operations which will read the data from memory or a processor's data cache depending upon where the most up-to-date copy is located. For I/O input, I/O adapter 13 performs coherent write operations which write the data to memory and also update or invalidate matching lines in cache 17 within processor 10 or in cache 18 within processor 11. For more information on coherent read and write operations see David A. Patterson, John L. Hennessy, *Computer Architecture A Quantitative Approach,* Morgan Kauffman Publishers, Inc., San Mateo, California, 1990, chapter 8, pp. 466–474.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computing system, comprising:

an intercomect means for providing information transfer;

a main memory coupled to the interconnect means;

an I/O adapter, coupled to the interconnect means, the I/O adapter including a translation map, the translation map mapping I/O page numbers to memory address page numbers, the trmslation map including coherence indices; and, a processor, coupled to the interconnect means, the processor including a cache and instruction execution means for, in response to an instruction executed by the processor, generating a coherence index to be stored in the translation map, the instruction execution memos performing in hardware a hash operation to generate the coherence index, wherein the I/O adapter is not contained within the processor;

wherein when the I/O adapter forwards the coherence index from the I/O adapter to the processor during performance of a data transfer, the processor uses the coherence index to detect whether an updated version of relevant data resides within the cache, and when the processor detects that an updated version of relevant data resides within the cache, the updated version of relevant data is used for the data transfer rather than stale data within the main memory.

2. A computing system as in claim 1 wherein the instruction specifies a load coherence index operation, a virtual memory offset and a space identification, and wherein the instruction execution means, in response to the intruction performs the hash operation on a subset of bits from the virtual memory offset and a subset of bits from the space identification to generate the coherence index.

3. A computing system as in claim 2 wherein the virtual memory offset is stored in a first general register, the space identification is stored in a second general register and the coherence index is placed in a target general register.

4. A computing system as in claim 3 wherein the instruction specifies the virtual memory offset by identifying the first general register, specifies the space identification by identifying the second general register and specifies the target general register.

5. A computing system as in claim 1 wherein the instruction specifies a base register, an index register, a space register select and a target register, and wherein the instruction execution means, in response to the instruction, generates a space identification from information stored in the base register and the space register select, generates an offset from information stored in the base register and information stored in the index register, and performs the hash operation on a subset of bits from the offset and a subset of bits from the space identification to generate the coherence index.

6. A computing system as in claim 5 wherein the base register is a first general register which currently stores a base value, the index register is a second general register which currently stores an index value, the target register is a third general register which will receive the coherence index.

7. A computing system as in claim 1 wherein the instruction specifies at least one register that is used to generate a virtual address.

8. In a computing system, a method comprising the steps of:

(a) generating a coherence index by a processor comprising the substep of
(a.1) in response to a load coherence index instruction executed by the processor, performing in hardware a hash operation to generate the coherence index;

(b) storing the coherence index in a translation map within an I/O adapter, the I/O adapter not being contained within the processor;

(c) forwarding the coherence index from the I/O adapter to the processor upon performing a data transfer; and, (d) upon the processor receiving the coherence index from the I/O adapter in step (c), using the coherence index by the processor to detect whether an updated version of relevant data resides within a cache within the processor, and when the processor detects that an up dated version of relevant data resides within the cache, the updated version of relevant data is used for the data transfer rather than stale data within a main memory which is external to the processor.

9. A method as in claim 8 wherein in substep (a.1) the load coherence index instruction specifies a load coherence index operation, a virtual memory offset and a space identification, and wherein substep (a.1) includes performing a hash operation on a subset of bits from the virtual memory offset and a subset of bits from the space identification to generate the coherence index.

10. A method as in claim 9 wherein in substep (a.1) the virtual memory offset is stored in a first general register, the space identification is stored in a second general register and the coherence index is placed in a target general register.

11. A method as in claim 10 wherein in substep (a.1) the load coherence index instruction specifies the virtual memory offset by identifying the first general register, specifies the space identification by identifying the second general register and specifies the target general register.

12. A method as in claim 8 wherein in substep (a.1), the load coherence index instruction specifies a base register, an index register, a space register select and a target register, and wherein substep (a.1) includes generating a space identification from information stored in the base register and the space register select, generating an offset from information stored in the base register and information stored in the index register and performing a hash operation on a subset of bits from the offset and a subset of bits from the space identification to generate the coherence index.

13. A method as in claim 12 wherein in substep (a.1) the base register is a first general register which currently stores a base value, the index register is a second general register which currently stores an index value, the target register is a third general register which will receive the coherence index.

14. A method as in claim 8 wherein in substep (a.1) the load coherence index instruction specifies a load coherence index operation and at least one register which is used to generate a virtual address.

15. A processor comprising:
   a cache; and,
   instruction execution means, coupled to the cache, for, in response to an instruction executed by the processor, generating a coherence index to be stored in a translation map within a I/O adapter, the instruction execution means performing in hardware a hash operation to generate the coherence index;
   wherein the I/O adapter is not contained within the processor, and
   wherein when the I/O adapter forwards the coherence index from the I/O adapter to the processor during performance of a data transfer, the processor uses the coherence index to detect whether an updated version of relevant data resides within the cache, and when the processor detects that an updated version of relevant data resides within the cache, the updated version of relevant data is used for the data transfer rather than stale data within a main memory which is external to the processor.

16. A processor as in claim 15 wherein the instruction specifies a load coherence index operation, a virtual memory offset and a space identification, and wherein the instruction execution means, in response to the instruction, performs the hash operation on a subset of bits from the virtual memory offset and a subset of bits from the space identification to generate the coherence index.

17. A processor as in claim 16 wherein the virtual memory offset is stored in a first general register, the space identification is stored in a second general register and the coherence index is placed in a target general register.

18. A processor as in claim 17 wherein the instruction specifies the virtual memory offset by identifying the first general register, specifies the space identification by identifying the second general register and specifies the target general register.

19. A processor as in claim 15 wherein the instruction specifies a base register, an index register, a space register select and a target register, and wherein the instruction execution means, in response to the instruction, generates a space identification from information stored in the base register and the space register select, generates an offset from information stored in the base register and information stored in the index register, and performs hash operation on a subset of bits from the offset and a subset of bits from the space identification to generate the coherence index.

20. A processor as in claim 19 wherein the base register is a first general register which currently stores a base value, the index register is a second general register which currently stores an index value, the target register is a third general register which will receive the coherence index.

21. A computing system as in claim 15 wherein the instruction specifies at least one register that is used to generate a virtual address.

* * * * *

UNITED STATES PATENT AND TRADEMARK OFFICE
CERTIFICATE OF CORRECTION

PATENT NO. : 5,515,522
DATED : May 7, 1996
INVENTOR(S) : K. Monroe Bridges et al.

It is certified that error appears in the above-identified patent and that said Letters Patent is hereby corrected as shown below:

Column 7,
Line 38, delete "itrmslatino" and insert therefor -- translation --

Signed and Sealed this

Thirteenth Day of July, 2004

JON W. DUDAS
*Acting Director of the United States Patent and Trademark Office*